United States Patent
DeLuca et al.

(10) Patent No.: US 8,826,129 B2
(45) Date of Patent: Sep. 2, 2014

(54) MULTI-TOUCH DEVICE HAVING A BOT WITH LOCAL AND REMOTE CAPABILITIES

(75) Inventors: Lisa Seacat DeLuca, San Francisco, CA (US); Lydia Mai Do, RTP, NC (US); Steven M. Miller, Cary, NC (US); Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 12/356,651

(22) Filed: Jan. 21, 2009

(65) Prior Publication Data
US 2010/0185946 A1 Jul. 22, 2010

(51) Int. Cl.
*G06F 3/00* (2006.01)
*G06F 3/048* (2013.01)

(52) U.S. Cl.
USPC ............ 715/706; 715/758; 715/762; 715/763

(58) Field of Classification Search
USPC .................. 715/706, 769, 757–758, 762, 763
See application file for complete search history.

(56) References Cited

U.S. PATENT DOCUMENTS

| | | | | |
|---|---|---|---|---|
| 5,880,731 | A * | 3/1999 | Liles et al. ..................... | 715/758 |
| 6,411,275 | B1 * | 6/2002 | Hedberg ...................... | 715/786 |
| 6,910,186 | B2 * | 6/2005 | Kim .............................. | 715/758 |
| 7,069,516 | B2 * | 6/2006 | Rekimoto ..................... | 715/757 |
| 7,177,811 | B1 * | 2/2007 | Ostermann et al. .......... | 704/260 |
| 2005/0193339 | A1 * | 9/2005 | Meyers ......................... | 715/700 |
| 2008/0252595 | A1 * | 10/2008 | Boillot ......................... | 345/156 |

FOREIGN PATENT DOCUMENTS

| | | |
|---|---|---|
| CN | 1758248 A | 4/2006 |
| CN | 1265796 A | 9/2009 |

(Continued)

OTHER PUBLICATIONS

Author Unknown, Office Action for Chinese Counterpart Application No. CN201010002107, State Intellectual Property Office of the People's Republic of China, Apr. 25, 2011, pp. 1-12, Published by SIPO, P. R. China (English translation not available).

(Continued)

*Primary Examiner* — Weilun Lo
*Assistant Examiner* — Truc Chuong
(74) *Attorney, Agent, or Firm* — Lee Law, PLLC; Christopher B. Lee (57) ABSTRACT

A system, method, and program product for instantiating and executing a bot on an interface system are disclosed. A bot is an agent for the user and includes an animated visual personification. The system includes an interface system including a graphical user interface, a system for instantiating a bot and displaying the bot on the graphical user interface, and a command processing system for causing the bot to execute one of a plurality of actions in response to a user command. The plurality of actions includes at least one local capability and at least one remote capability. The at least one remote capability also includes a system for transferring the bot to a second interface at a remote location.

20 Claims, 6 Drawing Sheets

(56) References Cited

FOREIGN PATENT DOCUMENTS

| | | |
|---|---|---|
| JP | 06-189519 A | 2/1996 |
| JP | 09-349826 A | 3/1999 |
| JP | 10-082626 A | 9/1999 |
| JP | 11-123112 A | 11/2000 |
| JP | 12-329382 A | 5/2002 |
| JP | 13-055044 A | 9/2002 |
| JP | 13-323552 A | 5/2003 |
| JP | 13-380207 A | 7/2003 |
| JP | 14-130784 A | 11/2003 |
| JP | 19-042818 A | 9/2008 |

OTHER PUBLICATIONS

Author Unknown, Office Action for Chinese Counterpart Application No. CN201010002107, State Intellectual Property Office of the People's Republic of China, Sep. 7, 2011, pp. 1-11, Published by SIPO, P. R. China (English translation not available).

Author Unknown, Examination Report/Office Action for Chinese Counterpart Application No. CN201010002107, May 30, 2012, pp. 1-8, Published by the State Intellectual Property Office of the People's Republic of China (English translation not available).

* cited by examiner

MULTI-TOUCH DEVICE HAVING A BOT WITH LOCAL AND REMOTE CAPABILITIES

FIELD OF THE INVENTION

The present invention relates generally to multi-touch devices, and more particularly, relates to instantiating and executing a bot on an interface system with local and remote capabilities.

BACKGROUND OF THE INVENTION

Multi-touch devices relate to a technology developed to enhance user interaction with a computer. A user is able to touch the computer screen to perform desired tasks and to move objects around on a touch-based graphical user interface.

However, the majority of touch-based graphical user interfaces currently available on the market only provide monotonous and unappealing features, such as moving objects on a screen. The available touch-based graphical user interfaces lack a personification of the capabilities that the computer is able to perform. Users are unable to directly interact with the computer on a personal level.

In view of the foregoing, a need exists to overcome one or more of the deficiencies in the related art.

SUMMARY OF THE INVENTION

A system, method, and program product for instantiating and executing a bot on an interface system are disclosed. The system includes an interface system including a graphical user interface, a system for instantiating a bot and displaying the bot on the graphical user interface, and a command processing system for causing the bot to execute one of a plurality of actions in response to a user command. The plurality of actions includes at least one local capability and at least one remote capability. The at least one remote capability also includes a system for transferring the bot to a second interface at a remote location.

A first aspect of the invention provides a system for instantiating and executing a bot on an interface system, the system comprising: an interface system including a graphical user interface; a system for instantiating a bot and displaying the bot on the graphical user interface; and a command processing system for causing the bot to execute one of a plurality of actions in response to a user command, the plurality of actions including at least one local capability and at least one remote capability, wherein the at least one remote capability includes a system for transferring the bot to a second interface at a remote location.

A second aspect of the invention provides a method for instantiating and executing a bot on an interface system, the method comprising: providing an interface system including a graphical user interface; instantiating a bot and displaying the bot on the graphical user interface; and processing a user command, and in response to the user command, causing the bot to execute one of a plurality of actions, the plurality of actions including at least one local capability and at least one remote capability, wherein the at least one remote capability includes a system for transferring the bot to a second interface at a remote location.

A third aspect of the invention provides a computer readable medium having a computer program product stored thereon for instantiating and executing a bot on an interface system, which when executed comprises: program code for providing an interface system; program code for instantiating a bot and displaying the bot on the interface system; and program code for processing a user command and, in response to the user command, causing the bot to execute one of a plurality of actions, the plurality of actions including at least one local capability and at least one remote capability, wherein the at least one remote capability includes transferring the bot to a second interface at a remote location.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the invention provide an improved system, method, and program product for instantiating and executing a bot on an interface system.

Figure 1:
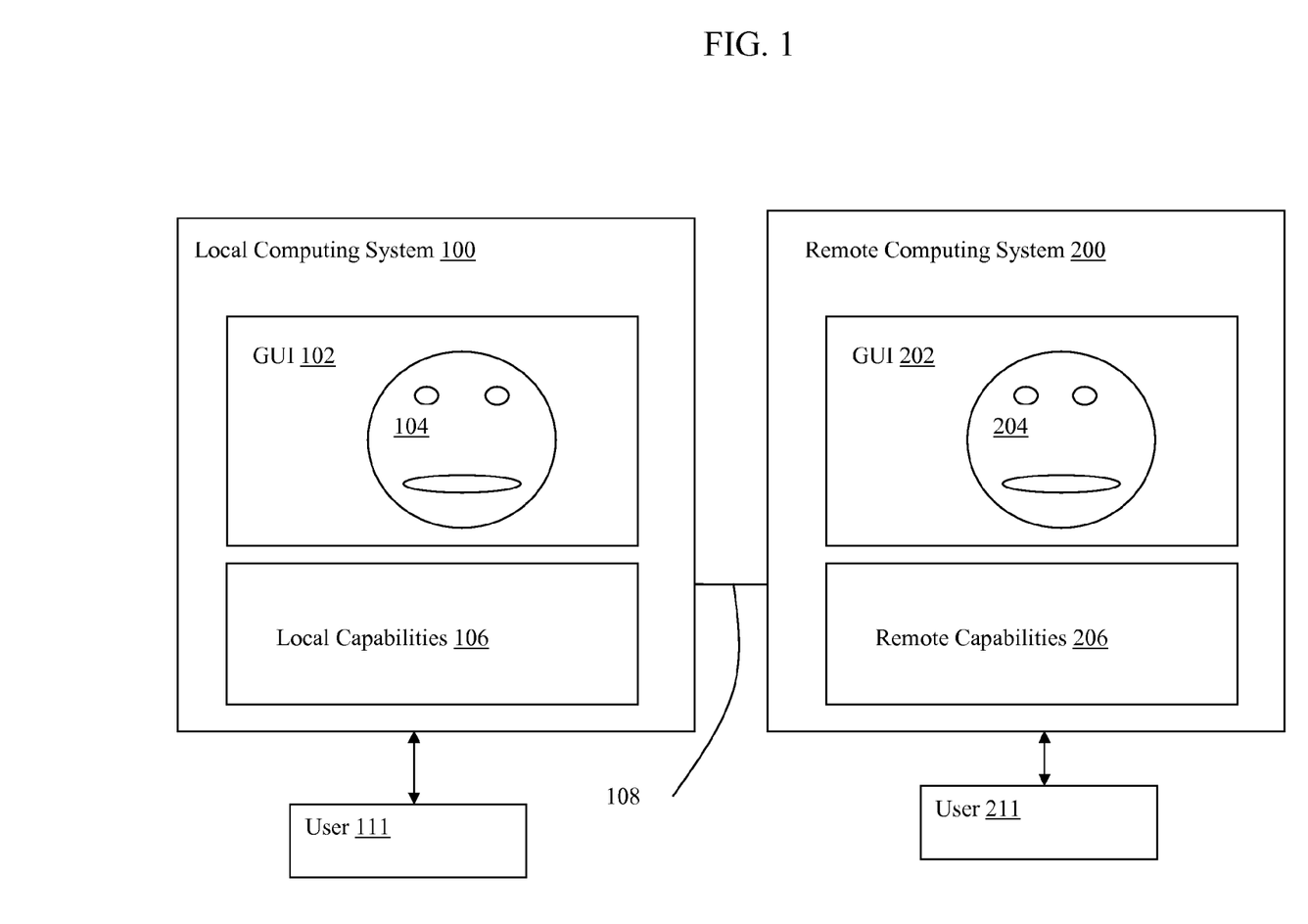
FIG. 1 depicts an illustrative diagram of a local computing system connected to a remote computing system in accordance with an embodiment of the present invention.

Referring now to FIG. 1, an illustrative diagram of a local computing system 100 having a graphical user interface 102 in accordance with an embodiment of the present invention is shown. The graphical user interface (GUI) 102 includes a bot 104. Local computing system 100 includes a set of local capabilities 106 that can be executed by a user 111 via bot 104. Illustrative local capabilities may include, e.g., games, entertainment, editing pictures, etc.

Also shown is a remote computing system 200 having a graphical user interface 202. Local computing system 100 is connected to remote computing system 200 via a connection 108 comprising, e.g., a direct hardwired connection or via any combination of wireline and/or wireless transmission methods. In the case of the latter, the connection 108 may utilize conventional network connectivity, such as Token Ring, Ethernet, WiFi, or other conventional communication standards.

Remote computing system 200 may include remote capabilities 206 that can be executed at remote computing system 200 in response to interactions with bot 104 at local computing system 100 by user 111. Remote capabilities 206 can likewise be executed by a user 211 via bot 204. Although FIG. 1 depicts bot 104 and bot 204, bot 104 may be the same as bot 204 that transfers from graphical user interface 102 on local computing system 100 to graphical user interface 202 on remote computing system 200. For example, a user 111 at local computing system 100 may request, by any standard, such as touch or voice command, a message to be sent to a user 211 at remote computing system 200. This message may be sent through bot 104 to bot 204. However, if bot 104 is the same as bot 204, the message is sent with the bot 104, 204 from the local computing system 100 to the remote computing system 200. Accordingly, bots 104, 204 are configured to perform automated functions on the behalf of users 111, 211.

Bot 104, 204 is an agent for the user and includes an animated visual personification. As an agent for the user, bot 104, 204 executes actions according to the user's commands. Although FIG. 1 illustrates bots 104, 204 to be human faces, it is understood that bots 104, 204 may be any animated visual personification including, but not limited to, animals, imaginary creatures, robots, etc. A user may also upload a digital picture so that the uploaded digital picture is displayed as the animated visual personification of bot 104, 204. Additionally, a user may draw a figure to be the animated visual personification of bot 104, 204.

The graphical user interfaces 102, 202 may include any type of input/output system, such as a touch detection system and/or a speech recognition system. Therefore, a user may either touch the graphical user interface 102, 202 or speak a command to cause the bot 104, 204 execute various actions, either locally or remotely. These systems will be discussed further in reference to FIG. 2.

Figure 2:
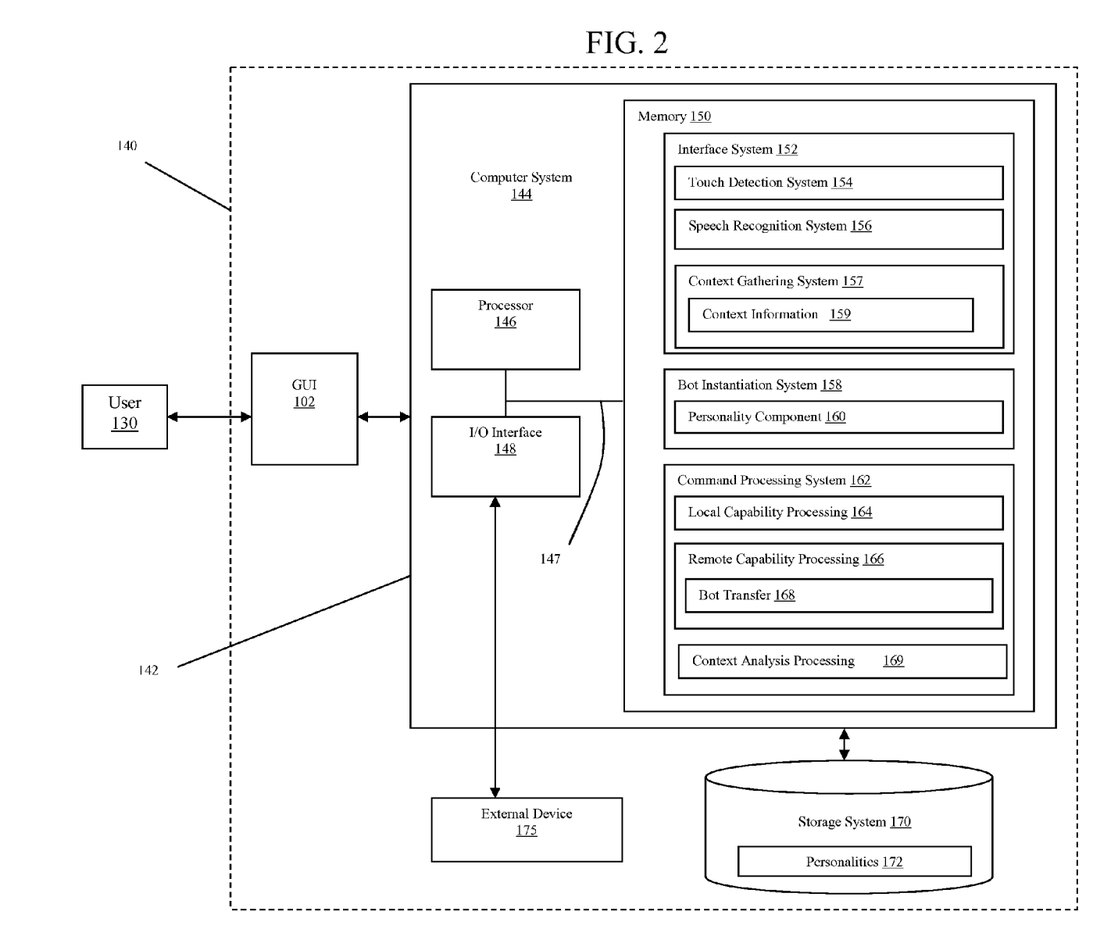
FIG. 2 depicts an illustrative system in accordance with an embodiment of the present invention.

Referring now to FIG. 2, an illustrative system 140 for initializing and executing a bot 104, 204 (FIG. 1), in accordance with an embodiment of the present invention, is shown. The system 140 includes a computer infrastructure 142 that can perform various processes described herein. The computer infrastructure 142 is shown including computer system 144.

The computer system 144 is shown as including a processor 146, a memory 150, at least one input/output (I/O) interface 148, and a bus 147. Further, the computer system 144 is shown in communication with at least one external device 175 and a storage system 170. In general, the processor 146 executes computer program code, such as interface system 152, bot instantiation system 158, or command processing system 162, that are stored in memory 150 and/or storage system 170, and which is configured to implement any/all processes provided by the present invention. While executing computer program code, the processor 146 can read and/or write data from/to the memory 150, storage system 170, and/or I/O interface(s) 148. Bus 147 provides a communication link between each of the components in the computer system 144. The external device(s) 175 can comprise any device (e.g., graphical user interface 102) that enables a user to interact with the computer system 144 or any device that enables the computer system 144 to communicate with one or more other computer systems.

Interface system 152 provides any now known or later developed interface for allowing a user, such as user 130, to interact with the bot 104, 204 (FIG. 1). In this embodiment, interface system 152 includes a touch detection system 154, a speech recognition system 156, and a context gathering system 157. However, it is understood that interface system 152 may include any one or more of touch detection system 154, speech recognition system 156, or context gathering system 157. The details of the touch detection system 154, the speech recognition system 156, and the context gathering system 157 will be described below. Furthermore, interface system 152 may include any later developed system that allows a user to communicate and interact with the bot 104, 204 (FIG. 1).

Figure 3:
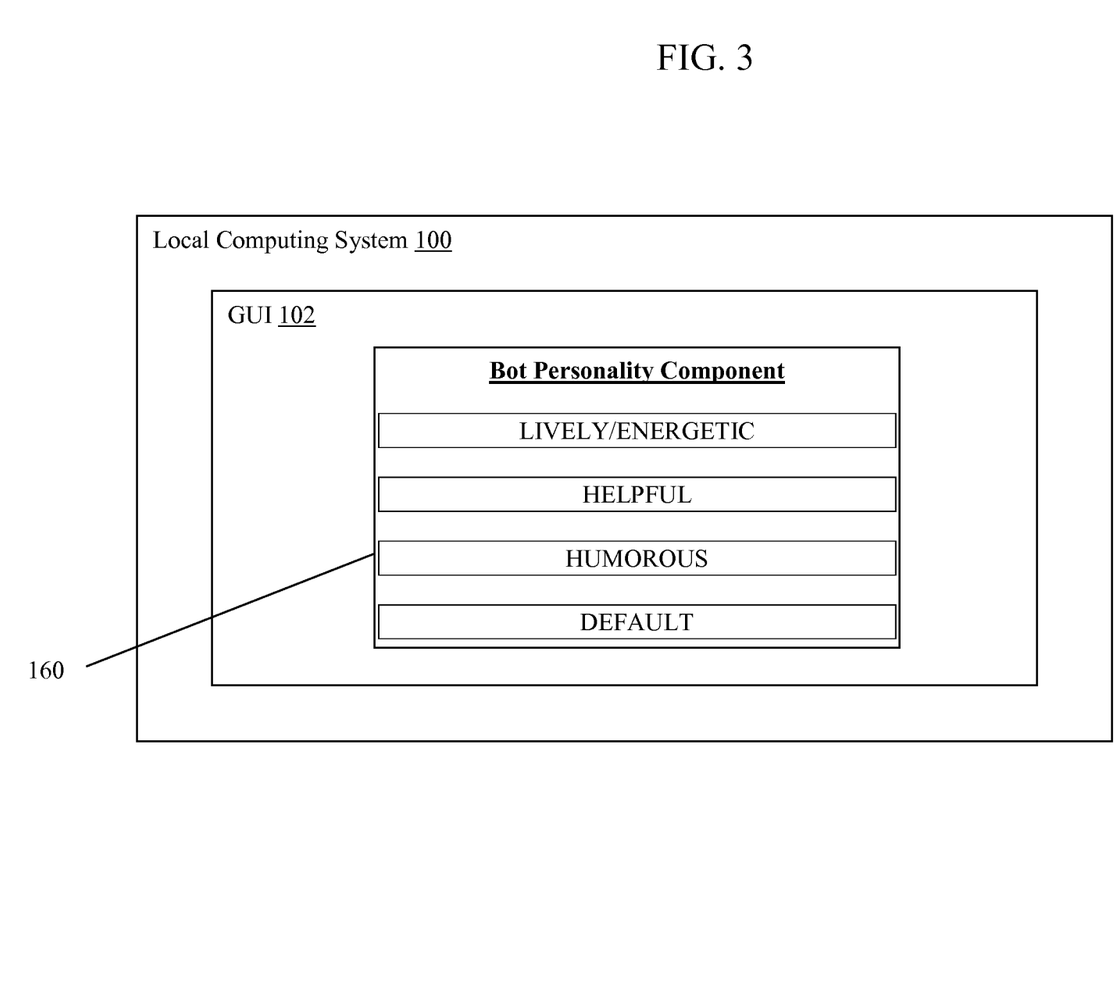
FIG. 3 depicts an illustrative diagram of the local computing system in accordance with an embodiment of the present invention.

Also included in memory 150 is a bot instantiation system 158. In this embodiment, bot instantiation system 158 includes a personality component 160. Personality component 160 enables a user 130 to choose a type of personality for the bot 104, 204 (FIG. 1). The personalities 172 may be stored in storage system 170. Referring now to FIGS. 2 and 3, bot personality component 160 may enable a user to choose personalities 172 such as lively/energetic, helpful, or humorous. Bot personality component 160 may also include a default personality as one of the personalities 172.

Referring back now to FIG. 2, memory 150 further includes a command processing system 162. Command processing system 162 enables the bot 104, 204 (FIG. 1) to execute actions in response to a user command, for example, from user 130. As mentioned above in reference to FIG. 1, the bot 104, 204 may perform both local capabilities and remote capabilities 106, 206. Therefore, command processing system 162 includes local capability processing 164 and remote capability processing 166 for processing local capabilities 106 and remote capabilities 206, respectively. Remote capability processing 166 includes a bot transfer 168 component for transferring a bot 104, 204 (FIG. 1) from one computing system to another computing system. For example, in reference to FIG. 1, bot transfer 168 will process the user's 130 command to transfer bot 104, 204 from the local computing system 100 to the remote computing system 200. Other examples of remote computing include sending a message to another patron in a restaurant located at another computing system, putting in an order at a restaurant, transferring notes from a business meeting, organize games between different tables, etc.

The user command from one or more users 130 may be determined by the touch detection system 154 or the speech recognition system 156. For example, a user 130 may touch the graphical user interface 102 to instruct the bot 104 or to get the attention of the bot 104. Alternatively, a user 130 may speak an instruction to the bot 104 which is received by the speech recognition system 156.

Context gathering system 157 provides any mechanism for gathering context information 159 regarding what is occurring proximate the interface system 152. Illustrative types of context information 159 may include, e.g., temperature, noise, number of people in a group, type of group (e.g., is the person on a date or out with his buddies or at a business meeting), cigarette smoke, drunkenness, anxiety, object identification, speech patterns, touch patterns, etc.

To analyze and react to the context information 159, the command processing system 162 may also include context analysis processing 169. Context analysis processing 169 receives context information 159 from the context gathering system 157, and causes the bot 104, 204 to behave according to context of the environment. Accordingly, the local and/or remote capabilities 106, 206 (FIG. 1) may be executed by the bot 104, 204 due to the context information 159 rather than (or in addition to) a user command.

For example, at a restaurant, context gathering system 157 may generate context information 159 that indicates that a customer (i.e., user 130) is impatient for the bill by repetitive tapping on the table. The repetitive tapping is received by e.g. a sensor. This context information 159 is processed by context analysis processing 169 which then causes remote capability processing 166 to notify the waitress.

Any system may be utilized for determining what action to take in response to collected context information 159. Examples include a table look-up, fuzzy logic, etc. In one illustrative embodiment, the bot 104, 204 can switch between active and passive roles based on context information 159.

For instance, rather than simply receiving and responding to user commands, the bot 104, 204 could take a pro-active role, such as telling a customer that that he or she does not need a third cigarette, or reminding a patron that they are driving and have had enough to drive.

Other examples include the bot 104, 204 guiding a sick customer to the bathroom, accepting your credit card to pay your bill, taking down a meal and/or drink order, organizing games at a restaurant or bar, asking questions or making jokes to entertain the group at the table, timing a business meeting to ensure that it does not run over, sending and saving business meeting notes, supplying a lost traveler with directions, etc.

Figure 4:
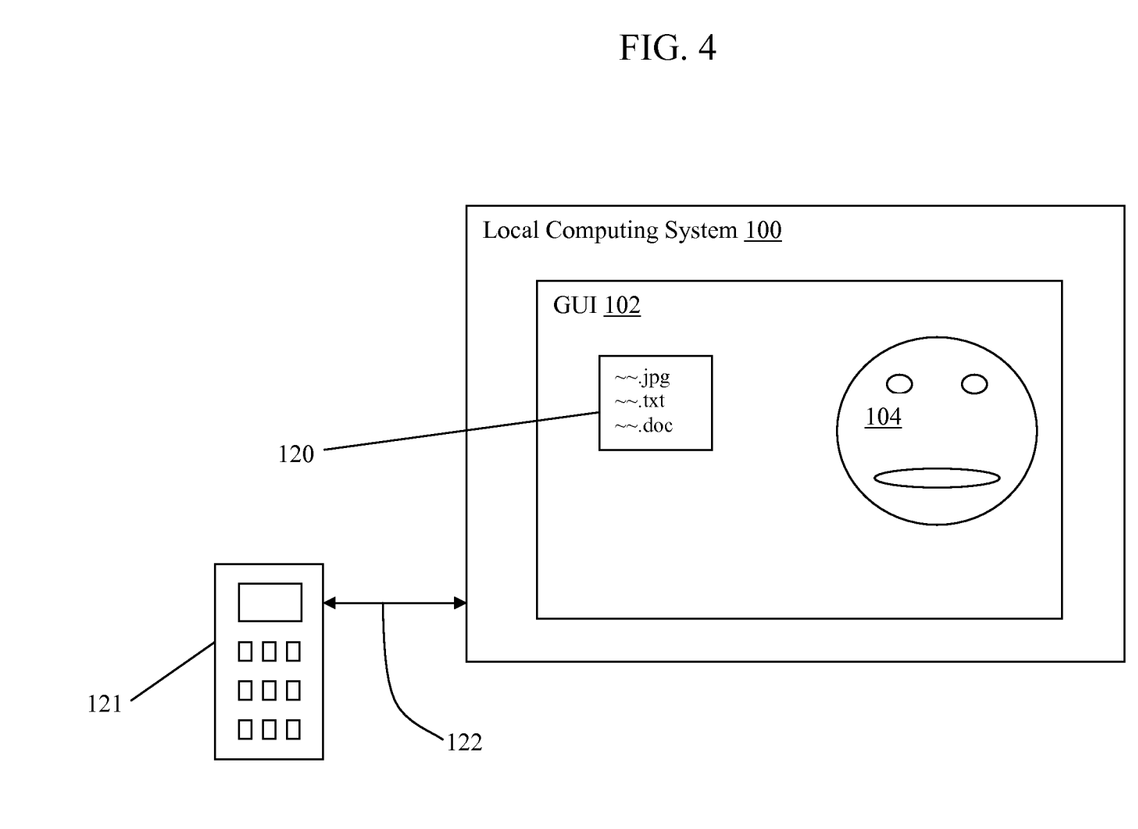
FIG. 4 depicts an illustrative diagram of the local computing system in accordance with an embodiment of the present invention.

Referring now to FIG. 4, a local computing system 100 is shown depicting a graphical user interface 102 and bot 104 according to an alternative embodiment of the present invention. In this embodiment, a first device 121 is connected 122 to the local computing system 100. The connection 122 can be via a direct hardwired connection or via any combination of wireline and/or wireless transmission methods. In the case of the latter, the connection 122 may utilize conventional network connectivity, such as Token Ring, Ethernet, WiFi, Bluetooth, or other conventional communication standards.

First device 121 may include any electronic device now known or later developed. Examples of first device 121 include cellular telephones, GPS systems, MPEG-1 Audio Layer 3 players (MP3), universal serial bus (USB) mass storage devices, etc.

Once the first device 121 is connected 122 to the local computing system 100, a data window 120 may appear on graphical user interface 102. The data window 120 may list the data stored in the first device 121, such as pictures, text documents, songs, etc. A user 130 (FIG. 2) may "click and drag" any one of the data in the data window 120 using his or her fingers to upload the data onto the local computing system 100, thereby utilizing the touch detection system 154 (FIG. 2). Alternatively, a user 130 (FIG. 2) may speak the name of the data listed in the data window 120 and request that the data be uploaded onto the local computing system 100, thereby utilizing the speech recognition system 156 (FIG. 2). Although FIG. 4 illustrates only one device 121 connected 122 to local computing system 100, the present invention may include any number of devices connected to local computing system 100.

Figure 5:
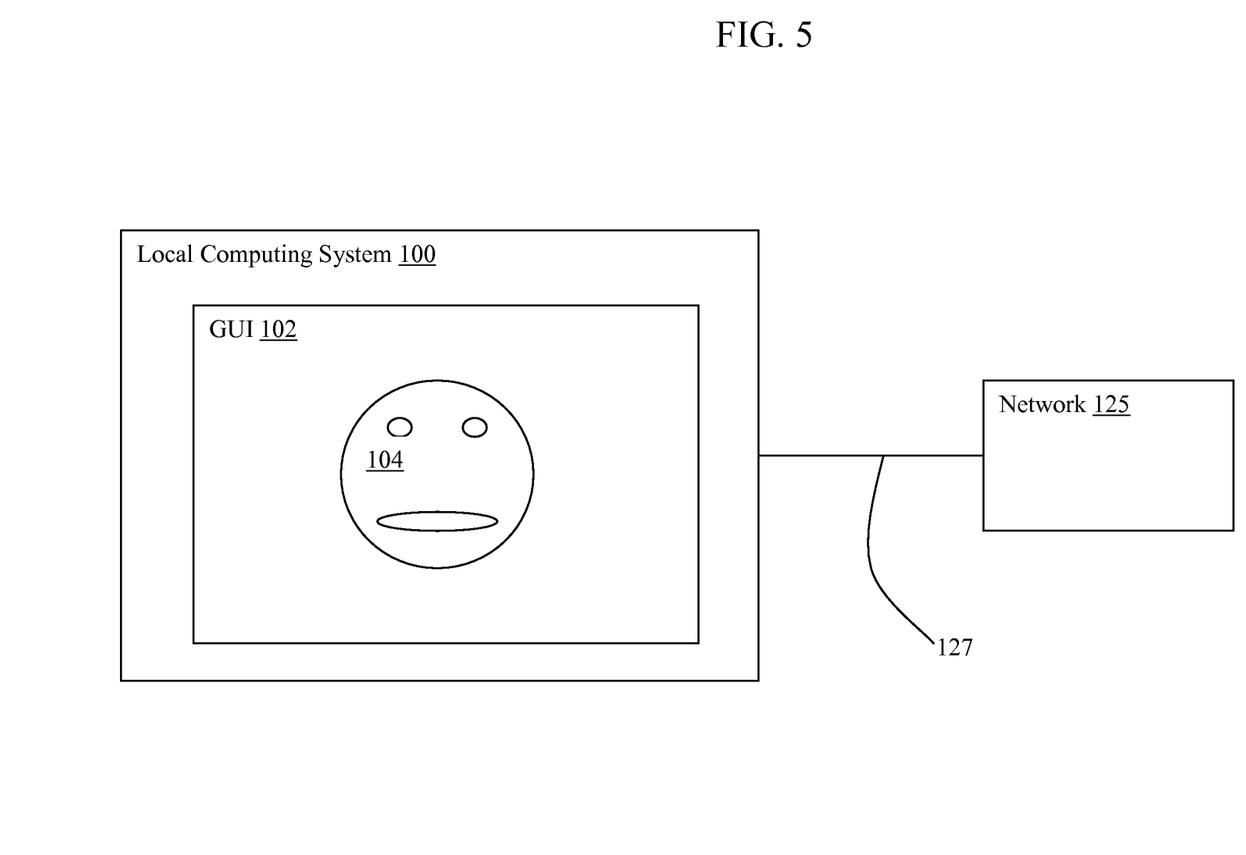
FIG. 5 depicts an illustrative diagram of the local computing system in accordance with an embodiment of the present invention.

Referring now to FIG. 5, an alternative embodiment of local computing system 100 including graphical user interface 102 and bot 104 is shown. Local computing system 100 may be connected 127 to a network 125. The connection 127 may be via a direct hardwired connection or via any combination or wireline and/or wireless transmission methods. In the case of the latter, the connection 127 may utilize conventional network connectivity, such as Token Ring, Ethernet, WiFi, Bluetooth, or other conventional communications standards.

A user 130 (FIG. 2) may utilize connection 127 to network 125 to instruct bot 104 to access data on the network 125. For example, a user may request statistical information pertaining to a sports team or the year of a historical event. Additionally, if the local computing system 100 is located on a table at a restaurant, a user 130 (FIG. 2) may request the check and pay with a credit card using the graphical user interface 102.

Figure 6:
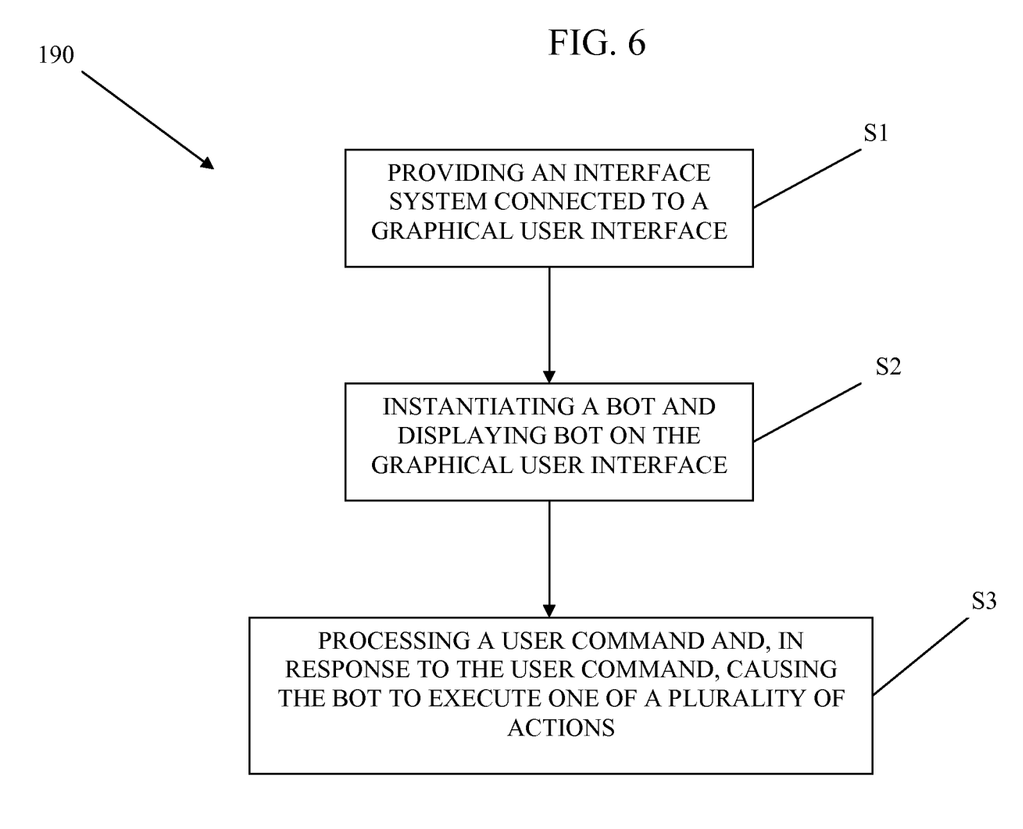
FIG. 6 depicts a flow diagram of a method in accordance with the present invention.

A flow diagram 190 of a method in accordance with the present invention is illustrated in FIG. 6. Initializing and executing a bot 104 on the graphical user interface 102 of a local computing system 100 (FIG. 1) includes the following steps: (step S1) providing an interface system connected to a graphical user interface; (step S2) instantiating a bot and displaying bot on the graphical user interface; and (step S3) processing a user command and, in response to the user command, causing the bot to execute one of a plurality of actions.

Referring back to FIG. 2, the computer system 144 can comprise any general purpose computing article of manufacture capable of executing computer program code installed by a user (e.g., a personal computer, server, handheld device, etc.). However, it is understood that the computer system 144 is only representative of various possible computer systems that may perform the various processes of the invention. To this extent, in other embodiments, the computer system 144 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 142 is only illustrative of various types of computer infrastructures that can be used to implement the present invention. For example, in an embodiment, the computer infrastructure 142 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 2 can be implemented independently, combined, and/or stored in memory for one or more separate computer systems that communicate over a network. In other words, interface system 152, bot instantiation system 158, and command processing system 162 may be stored in memory on different computer systems. Further, it is understood that some of the systems and/or functionality may not be implemented, or additional systems and/or functionality may be included as part of the system 140.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 150 and/or storage system 170 (e.g., a fixed disk, a read-only memory, a random access memory, a cache memory, etc.).

In still another embodiment, a computer infrastructure, such as the computer infrastructure 142, can be obtained (e.g., created, maintained, having made available to, etc.) and one or more systems for performing the processes of the invention can be obtained (e.g., created, purchased, used, modified, etc.) and deployed to the computer infrastructure 142. To this extent, the deployment of each system can comprise one or more of (1) installing program code on a computer system, such as the computer system 144, from a computer-readable medium; (2) adding one or more computer systems to the computer infrastructure 142; and (3) incorporating and/or modifying one or more existing systems of the computer infrastructure 142, to enable the computer infrastructure 142 to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclose, and obviously, many modifications and variations are possible. Such modifications and variations that may be apparent to an individual in the art are included within the scope of the invention as defined by the accompanying claims.

What is claimed is:

1. A system, comprising:
    a memory;
    an interface system comprising a graphical user interface; and
    a hardware processor programmed to:
       instantiate within the memory an executable bot object as a functional user interface command processing component of the interface system, where the executable bot object functionally executes actions in response to user commands;
       display an animated visual personification of the executable bot object on the graphical user interface of the interface system; and
       cause the executable bot object to process at least one user command that each causes the executable bot object to execute one of a plurality of automated functional actions as indicated by the respective user command, the plurality of automated functional actions comprising at least one local capability and at least one remote capability, where the at least one remote capability comprises transferring the executable bot object and the animated visual personification of the executable bot object to a second interface system at a remote location.

2. The system of claim 1, where the interface system comprises at least one of a touch detection system and a speech recognition system.

3. The system of claim 1, where the hardware processor is further programmed to gather, via the interface system, context information occurring in an environment proximate to the interface system, where the context information is distinct from the user commands.

4. The system of claim 3, where the hardware processor is further programmed to:
    process the gathered context information; and
    cause the executable bot object to execute one of the plurality of automated functional actions based on the gathered context information.

5. The system of claim 4, where the context information is selected from a group consisting of: temperature, noise level, movement, object detection, speech patterns, and touch patterns.

6. The system of claim 1, further comprising a personality component, and where in being programmed to instantiate within the memory the executable bot object as the functional user interface command processing component of the interface system, the hardware processor is programmed to:
    allow, via the personality component, a user to select a type of functional personality of the executable bot object expressed by the animated visual personification of the executable bot object displayed on the graphical user interface; and
    cause, via the personality component, the animated visual personification of the executable bot object to express the user-selected type of functional personality of the executable bot object within the graphical user interface.

7. The system of claim 1, where, in being programmed to cause the executable bot object to execute the at least one local capability, the hardware processor is programmed to cause the executable bot object to upload data from a first device and transfer the uploaded data to a second device.

8. The system of claim 1, where, in being programmed to cause the executable bot object to execute the at least one remote capability, the hardware processor is programmed to cause the executable bot object to access data from a network.

9. A method, comprising:
    providing an interface system comprising a graphical user interface;
    instantiating within a memory an executable bot object as a functional user interface command processing component of the interface system, where the executable bot object functionally executes actions in response to user commands;
    displaying an animated visual personification of the executable bot object on the graphical user interface of the interface system; and
    causing the executable bot object to process at least one user command that each causes the executable bot object to execute one of a plurality of automated functional actions as indicated by the respective user command, the plurality of automated functional actions comprising at least one local capability and at least one remote capability, where the at least one remote capability comprises transferring the executable bot object and the animated visual personification of the executable bot object to a second interface system at a remote location.

10. The method of claim 9, where the interface system comprises at least one of a touch detection system and a speech recognition system.

11. The method of claim 9, further comprising:
    gathering context information occurring in an environment proximate to the interface system, where the context information is distinct from the user commands;
    processing the gathered context information; and
    causing the executable bot object to execute one of the plurality of automated functional actions based on the gathered context information.

12. The method of claim 9, where the context information is selected from a group consisting of: temperature, noise level, movement, object detection, speech patterns, and touch patterns.

13. The method of claim 9, where instantiating within the memory the executable bot object as the functional user interface command processing component of the interface system comprises:

allowing, via a personality component, a user to select a type of functional personality of the executable bot object expressed by the animated visual personification of the executable bot object displayed on the graphical user interface; and causing, via the personality component, the animated visual personification of the executable bot object to express the user-selected type of functional personality of the executable bot object within the graphical user interface.

14. The method of claim 9, where executing the at least one local capability comprises causing the executable bot object to upload data from a first device and transfer the uploaded data to a second device.

15. The method of claim 9, where executing the at least one remote capability comprises causing the executable bot object to access data from a network.

16. A non-transitory computer readable storage medium having a computer program product stored thereon for instantiating and executing an executable bot object on an interface system, which when executed comprises:

program code for providing an interface system comprising a graphical user interface;

program code for instantiating within a memory the executable bot object as a functional user interface command processing component of the interface system, where the executable bot object functionally executes actions in response to user commands;

program code for displaying an animated visual personification of the executable bot object on the graphical user interface of the interface system; and program code for causing the executable bot object to process at least one user command that each causes the executable bot object to execute one of a plurality of automated functional actions as indicated by the respective user command, the plurality of automated functional actions comprising at least one local capability and at least one remote capability, where the at least one remote capability comprises transferring the executable bot object and the animated visual personification of the executable bot object to a second interface system at a remote location.

17. The non-transitory computer readable storage medium of claim 16, where the interface system comprises at least one of a touch detection system and a speech recognition system.

18. The non-transitory computer readable storage medium of claim 16, where the program code for providing the interface system further comprises:

program code for gathering context information occurring in an environment proximate to the interface system, where the context information is distinct from the user commands;

program code for processing the gathered context information; and program code for causing the executable bot object to execute one of the plurality of automated functional actions based on the gathered context information.

19. The non-transitory computer readable storage medium of claim 16, where the program code for instantiating within the memory the executable bot object as the functional user interface command processing component of the interface system comprises:

program code for a personality component that allows a user to select a type of functional personality of the executable bot object expressed by the animated visual personification of the executable bot object displayed on the graphical user interface; and program code for causing, via the personality component, the animated visual personification of the executable bot object to express the user-selected type of functional personality of the executable bot object within the graphical user interface.

20. The non-transitory computer readable storage medium of claim 16, where the program code for causing the executable bot object to:

execute the at least one local capability comprises program code for causing the executable bot object to upload data from a first device and transfer the uploaded data to a second device; and execute the at least one remote capability comprises program code for causing the executable bot object to access the transferred data from a network.

* * * * *